(12) United States Patent
Bantz et al.

(10) Patent No.: US 6,865,517 B2
(45) Date of Patent: Mar. 8, 2005

(54) AGGREGATION OF SENSORY DATA FOR DISTRIBUTED DECISION-MAKING

(75) Inventors: David F. Bantz, Bedford Hills, NY (US); John S. Davis, II, New York, NY (US); Rafah A. Hosn, New York, NY (US); Nicholas M. Mitchell, White Plains, NY (US); Veronique Perret, Washington Township, NJ (US); Daby M. Sow, Riverdale, NY (US); Jeremy B. Sussman, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 10/317,708

(22) Filed: Dec. 11, 2002

(65) Prior Publication Data

US 2004/0117157 A1 Jun. 17, 2004

(51) Int. Cl.[7] ................................................ G06F 15/00
(52) U.S. Cl. ........................ 702/188; 702/104; 702/116; 702/121; 702/188; 707/104.1; 707/10; 706/934; 712/4; 712/5; 712/6; 714/4; 714/43; 714/48
(58) Field of Search ................................. 702/104, 116, 702/120, 121, 188, 189; 707/104.1, 10; 706/934; 712/4–6; 714/4, 43, 48

(56) References Cited

U.S. PATENT DOCUMENTS

| 5,365,423 A | 11/1994 | Chand |
| 5,537,339 A | 7/1996 | Naganuma et al. |
| 6,098,106 A | * 8/2000 | Philyaw et al. ............. 709/238 |
| 2002/0184235 A1 | * 12/2002 | Young et al. ............ 707/104.1 |
| 2003/0074602 A1 | * 4/2003 | Lomet et al. .................. 714/15 |
| 2003/0164862 A1 | * 9/2003 | Cadiz et al. ................ 345/838 |
| 2003/0174826 A1 | * 9/2003 | Hesse .................... 379/210.01 |

OTHER PUBLICATIONS

Joa–Ng et al., 'A Peer–to–Peer Zone–Based Two–Level Link State Routing for Mobile Ad Hoc Networks', Aug. 1999, IEEE, pp. 1415–1425.*
Tsang et al., 'Development of Distributive Lighting Control System Using Local Operating Network', May 1994, IEEE, pp. 879–889.*
Kunito et al., 'An Ad–hoc Routing Control Method in Sensor Networks', Jan. 2000, IEEE, pp. 1147–1152.*
NASA, 'IP in Space Peer Review', Jan. 2001, pp. 1–24.*

* cited by examiner

*Primary Examiner*—Patrick Assouad
*Assistant Examiner*—Elias Desta
(74) *Attorney, Agent, or Firm*—Louis P. Herzberg; David Aker

(57) ABSTRACT

A method, apparatus and computer product that enables a processor associated with a node in a computer system having various nodes, the nodes having sensors which provide data, and the nodes being connected by a communications facility acquiring local data from the sensor and remote data from other nodes via the data transfer facility. The nodes process data from a local sensor at the node and from remote sensors at other nodes; and analyze the local data, data from other nodes and local decisions made at and received from other nodes to make a local decision for action at the node. A local decision made at a node is in turn communicated to other nodes.

49 Claims, 6 Drawing Sheets

AGGREGATION OF SENSORY DATA FOR DISTRIBUTED DECISION-MAKING

FIELD OF THE INVENTION

This invention relates to computer systems. More particularly, the invention belongs to a class of software systems known as "peer" or "distributed" computing systems.

BACKGROUND OF THE INVENTION

Wireless connectivity (e.g., BlueTooth. 802.11) is most often used in a client/server system architecture, where data captured by the client is forwarded to the server for aggregation with other data and subsequent processing. In part, this has been due to the limited computing resources of the most mobile clients. Technology developments have now made possible significant local computing resources, even for the smallest and lightest clients. It is also often the case that the ability of these client devices to connect to servers requires long-range wireless connectivity, and this is not supported universally. The combination of the availability of shorter-range wireless connectivity with significant local computing resources makes a new computing architecture possible: that of a spontaneous geographically proximate group of computers that agree to collaborate on a specific task. Software (e.g., JXTA, available at www.jxta.org) is now available to coordinate this spontaneous group.

A new class of applications is also emerging: applications that use real-time sensory data to make decisions about how to act on the user's behalf. These applications are referred to in the computer science literature as "context-aware." However, these applications are limited to data obtained from sensors connected to the same platform as that which runs the application, or from sensors that can be connected to that platform via wired or wireless means.

U.S. Pat. No. 5,365,423 issued to Chand discloses behavioral models of distributed sensors, these behavioral models being predictive of future state. The models are used to predict failures in the system. U.S. Pat. No. 5,537,339 issued to Naganuma et. al. describes the centralized extraction of information from a multiplicity of control devices, and the transmission of certain derived information factors back to the control devices.

SUMMARY OF THE INVENTION

It is therefore an aspect of the present invention to provide a system, method and an article of manufacture having computer readable program code which permits the sharing of information from the various nodes, including decisions made at the nodes, but that supports autonomous decision making at each node.

The invention provides a more flexible system structure in which sensory data and the state of local decision-making is made aware to all members of a spontaneous geographically proximate group of computers. Applications of this structure include local decisions to participate in a group activity, decisions based on an assessment of risk or danger in a group activity, and decisions on the utilization of specific resources available to a group.

As an example of an application to participate in a group activity, the sensory data may be data determined from active tags on a store shelf, with that data indicative of a special sale for the item so tagged. Individual computers become aware of the special sale and decide to participate in it by buying the item. Both the existence of the sale and the decisions by others to buy are propagated to other members of the group, who then decide to buy as well. This example can easily be extended to spontaneous auctions.

As an example of local decisions based on an assessment of risk or danger, the sensory data may be data determined from a sound sensor, indicative of gunshots. In this example computers are carried by policemen and women and communicate with each other over short-range wireless communication links. The existence of gunshots in the vicinity causes individual computers to initiate an emergency message on a long-range communication link. This decision is propagated to other computers who do not initiate an emergency message, thereby obviating congestion on the long-range communication link. It is also possible to notify officers who are out of earshot of the existence of gunshots in the vicinity.

As an example of decisions on the utilization of specific resources available to a group, the sensory data may be data derived from position sensors on vehicles. When this data is communicated to other group members and correlated with the position of EZPass$^{SM}$ lanes, each individual computer may conclude that one of the lanes is congested and decide to suggest another lane to the vehicle's driver. Knowledge of what lanes have been chosen can be used to obviate a potential instability in this decision process: if there are only two lanes, and lane 1 is sensed to be congested, in a simple case all vehicles will opt for lane 2 which will cause lane 2 to become congested and will starve lane 1 for traffic. But knowledge of each vehicle's choice of lane can easily avoid this instability.

The invention disclosed here implements communication among the members of a spontaneous geographically proximate group, that communication including sensory data and the outcomes of local decision procedures. Local decisions are made on the basis of local and remote sensory data and on the outcomes of other (remote) decision procedures. In anthropomorphic terms, the invention facilitates group consensus with individual freedom of action.

The value of this invention is to allow local decisions to be made on the basis of more complete information, not just about the environment, but also about the decisions of others. This can improve user access to resources and reduce risk.

The invention belongs to a class of software systems known as "peer" or "distributed" computing. In such systems the software in each node, or processing element, is identical. Peer systems work through local decision-making based on information obtained from other nodes. This local decision-making is often customized to the node based on the wishes of its end user or other data that is particular to the node. Further, in accordance with the invention, sensory data and local decisions may be propagated among the members of a spontaneous group.

In the invention, each node or processing element in a network of computers implements two functions: query response and local processing. There are two types of queries: one in which a node queries all other nodes for data that they obtain from their local sensors. This data may be processed to enhance it by noise removal or other known techniques before it is made part of the reply. The second type of query is one in which a node queries all other nodes to determine what course of action those nodes have locally determined. This query response function is novel in the respect that queries are issued to determine what local course of action a node has decided upon. The ability to externalize local decisions is important for group decision-making. At times, it is important for a given node to "go along" with the action plans of other nodes, such as in an application in which consistent group behavior is obtained by having all members of the group act in concert. At other times, it is important for a given node to act in a way contrary to the actions of other group members, for example so as to assure that all members of the group do not attempt to use a common resource at the same time. Local processing concerns acquiring data from a local sensor, issuing the two query types to obtain sensor data and action decisions from remote nodes, and making a local action decision. The local action decision is typically based on local and remote sensor data, although it can be modified with knowledge of how other remote nodes are planning to act. Thus, an important aspect of the invention is in local processing.

Local processing is first driven by knowledge of local sensor data and remote sensor data. It is convenient to compare local sensor data with statistical characterizations of remote sensor data. For example, a decision to act can be based on significant differences between local sensor data and the average value of remote sensor data, as when a car attempts to select a speed that matches that of other, surrounding cars. A feature of the invention is the determination of a "situation", or circumstance, such as that in the example immediately above. Situations are application-dependent, but the existence of a situation is indicative of the need for action. In fact, the invention determines the specific action based on the type of situation that exists, if any.

Another key feature of the invention is the modification of the locally determined course of action based on knowledge of the actions of others. Again, the appropriate course of action can be contrarian, or opposite to that of the other members of the group, or it may be to act in concert with the other members of the group. This is a choice that is specific to the application. The invention provides a way to make this choice, and a way to implement it once made.

In summary, the invention concerns interactions between a node and its peers, such that sensory data is propagated among peers and leads to local decisions to act. The identification of what actions are planned is also propagated among peers, and may lead to modifications to the previously-made local decisions.

BRIEF DESCRIPTION OF THE DRAWINGS

These and other aspects, features, and advantages of the present invention will become apparent upon further consideration of the following detailed description of the invention when read in conjunction with the drawing figures, in which.

DESCRIPTION OF THE INVENTION

A preferred embodiment of the invention, including a description of the method employed and the necessary apparatus, will now be described.

Figure 1:
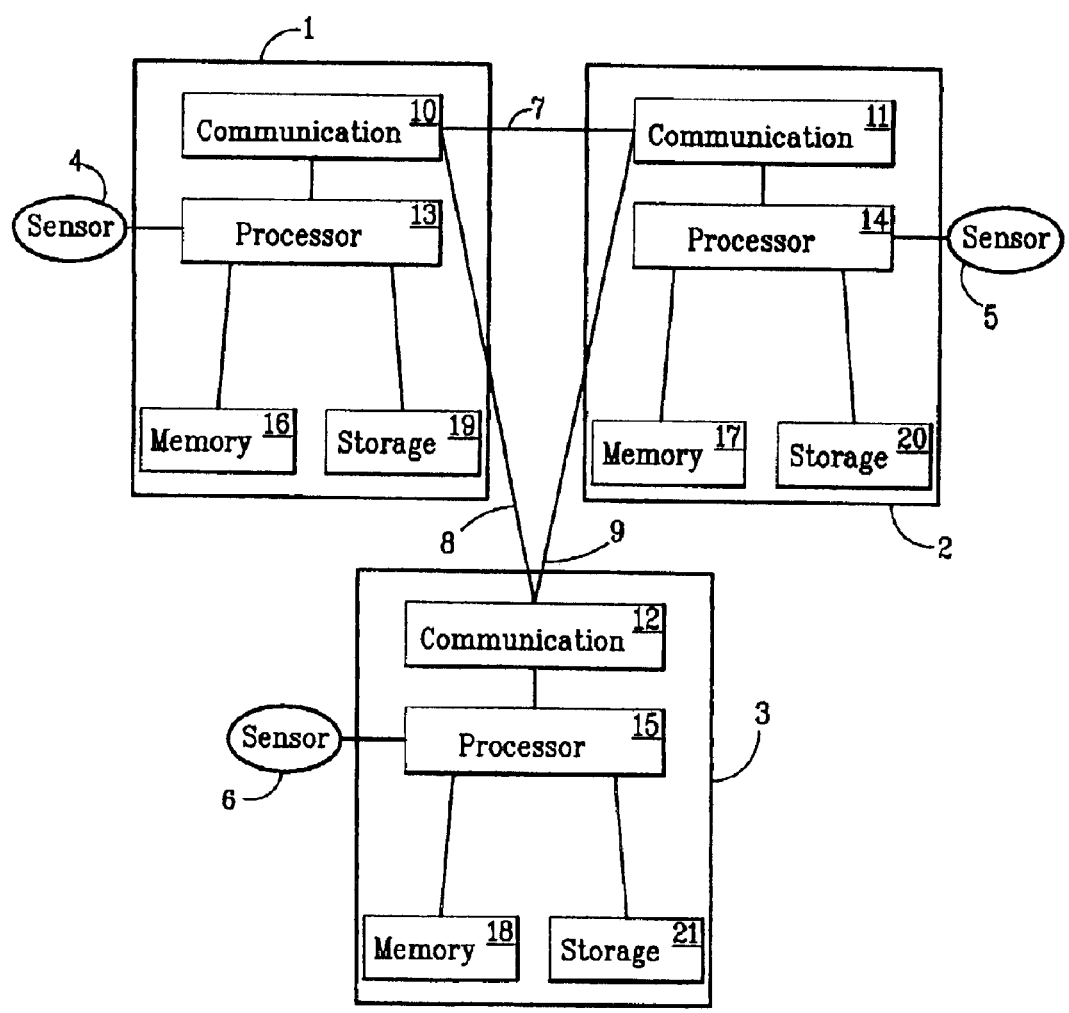
FIG. 1 is a block diagram of an exemplary computer system configured to implement the present invention.

FIG. 1 shows a block diagram of three computers, 1, 2 and 3, each with one sensor 4, 5 and 6, communicating with each other over communications links 7, 8 and 9. Each computer is comprised of a processor 13, 14 and 15 capable of communicating with memory 16, 17 and 18 and with storage 19, 20 and 21, and with a communication subsystem 10, 11 and 12. For example, processor 13 uses communication subsystem 10 to communicate with computer 2 over communication link 7. Processors 13, 14 and 15 are also capable of obtaining sensed data from sensors 4, 5 and 6, respectively.

Figure 2:
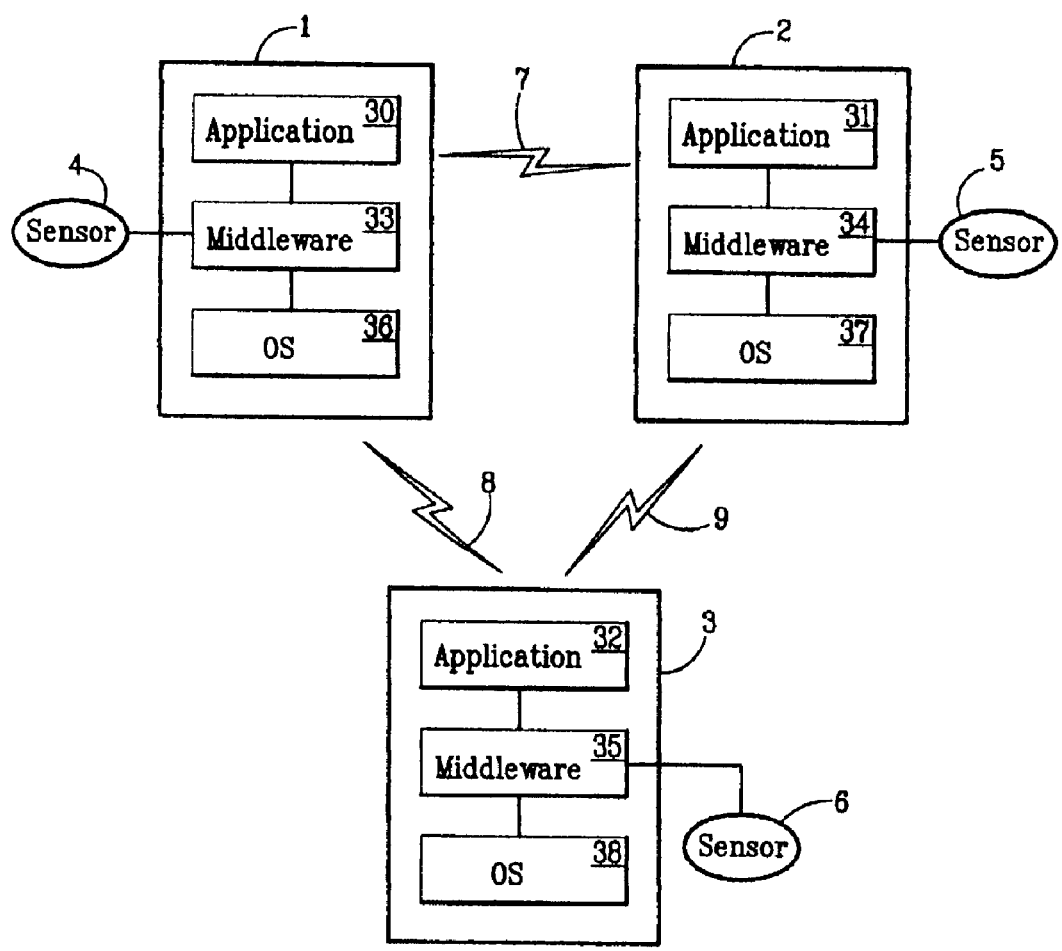
FIG. 2 is a block diagram of the software in the computers of FIG. 1.

FIG. 2 shows a block diagram of the software in computers 1, 2 and 3. During execution this software typically resides in memory 16, 17 and 18, respectively, of FIG. 1. The three major software components are the operating system 36, 37 and 38; middleware 33, 34 and 35, and application 30, 31 and 32. Middleware 33, 34 and 35 has two basic functions: to facilitate communication among applications 30, 31 and 32, and between applications 30, 31 and 32 and sensors 4, 5 and 6, respectively. For example, middleware 33 provides functions usable by application 30 to read data from sensor 4. Middleware 33 also provides functions usable by application 30 to communicate with applications 31 and 32. JXTA (see www.jxta.org) is an example of middleware providing functions usable by applications to communicate with other applications. One possible example of sensor middleware is the sensor Java class (see: http://www.arch.usyd.edu.au/~g smith/AWbot/docs/kcdcc/awa/base/Sensor.html).

Figure 3:
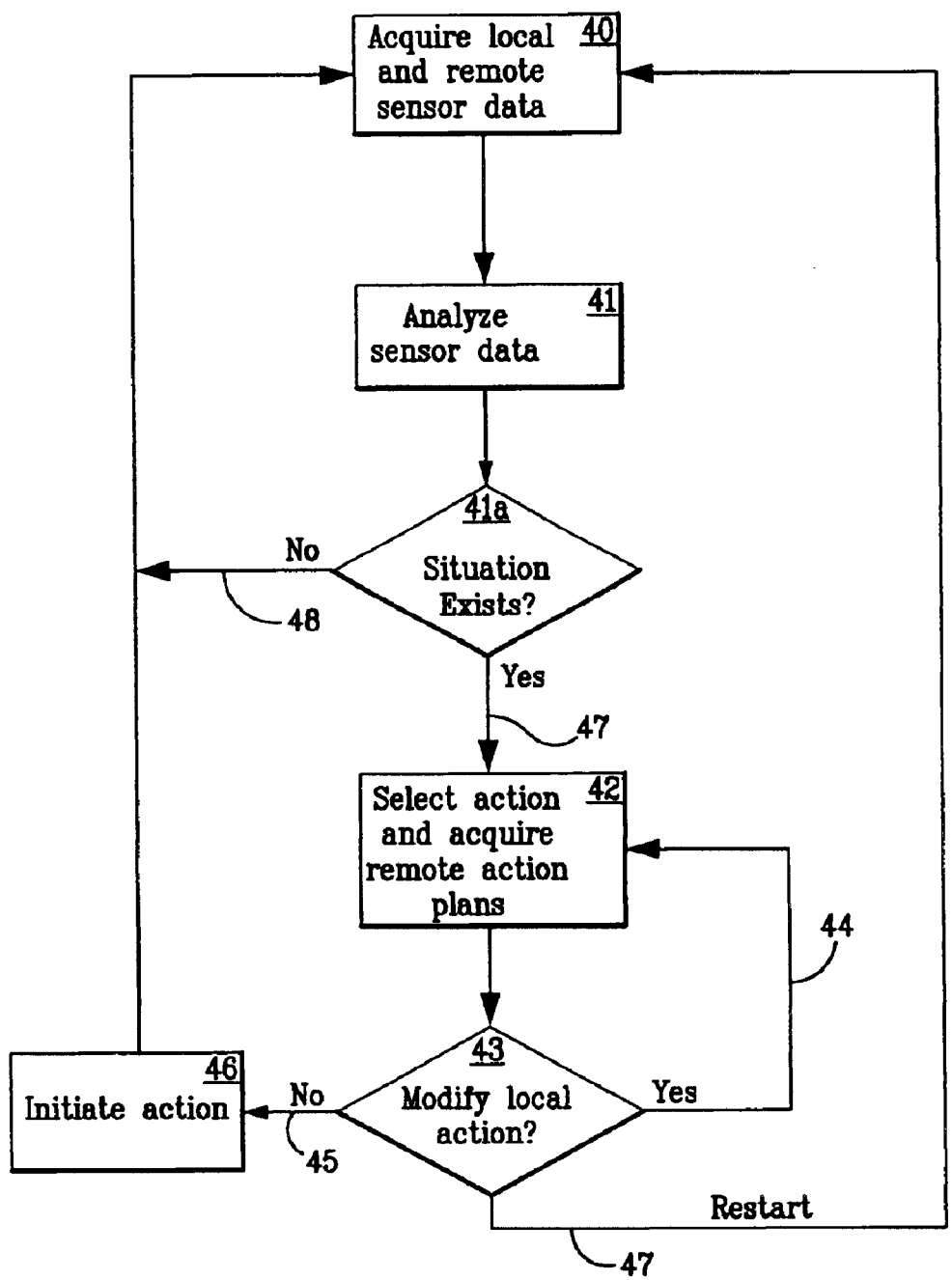
FIG. 3 is a software flow diagram of the application logic in accordance with the invention.

FIG. 3 is a software flow diagram for the application logic. Applications 30, 31 and 32 are shown in FIG. 2. The application is structured as a continuous loop, although this loop can be modified by initiating each iteration upon receipt of an event such as a change in local sensor data or upon the expiration of a timer. Block 40 reads the local sensor and uses middleware to query remote sensor data. Processing in response to this query, and to a subsequent query for action plans in block 42 will be detailed in FIG. 4. At the completion of block 40 both local and remote sensor data has been acquired for local processing in block 41.

Figure 5:
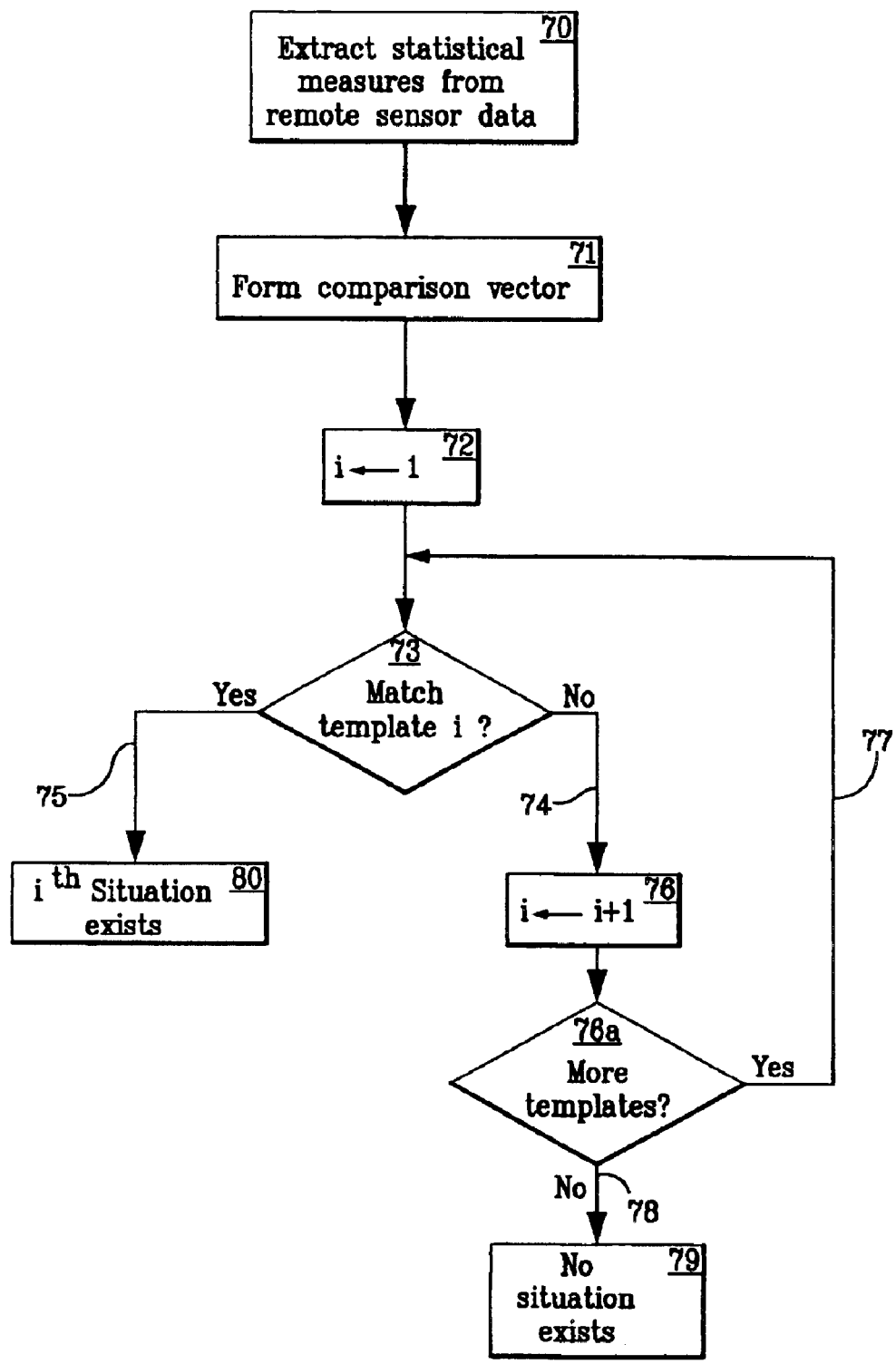
FIG. 5 is a flow diagram of situation determination in accordance with the invention.

Block 41 analyzes local and remote sensor data to determine, at decision block 41a, whether a situation exists for which action is to be taken, or whether no situation exists. If no situation exists then branch 48 is taken and the application loop recommences. If a situation exists then branch 47 is taken and block 42 is entered. A detailed description of the processing in block 41 is shown in FIG. 5. Block 42 selects a local action in response to the detected situation and acquires remote action plans. Processing in block 42 will be detailed in FIG. 6.

Once block 42 has determined a local action plan and has acquired remote action plans, block 43 is entered. The processing in block 43 is very specific to the application. For example, in certain applications it is to the advantage of the user of the computer to take an action opposite to that being taken by others (e.g. all other computers recommend moving to lane 3, which will then become congested as a result). In other applications it is to the advantage of the user of the computer to take an action similar to that being taken by others (e.g., other computers sense an attractive sale and the user's computer should recommend that he or she join in). If the comparison between the chosen local action and the actions of others is in accord with the dictates of the application, branch 45 is taken and block 46 will initiate the action. If the comparison between the chosen local action and the actions of others is not in accord with the dictates of the application, branch 44 is taken to reacquire the action plans of others. There may be situations in which it is appropriate for a branch 44 to be taken to restart the entire process of action selection.

Figure 4:
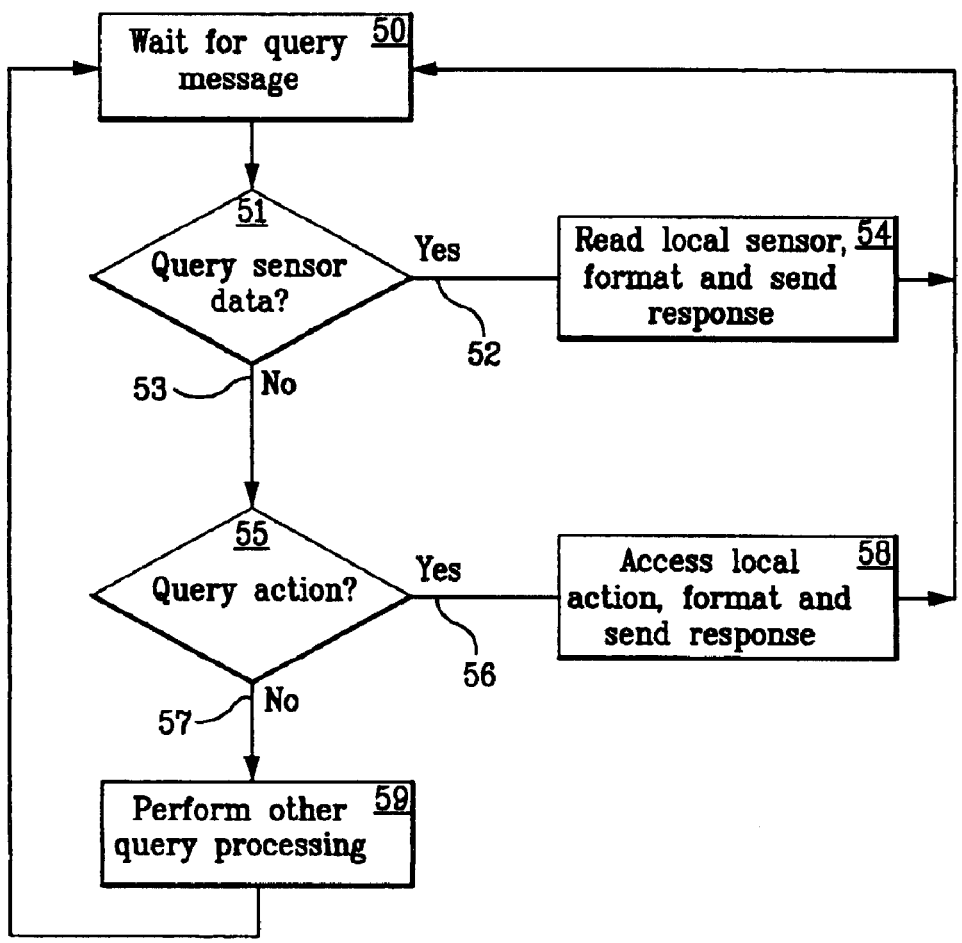
FIG. 4 is a software flow diagram of the actions of a remote computer upon receiving a query message.

FIG. 4 illustrates the actions of a remote computer upon receiving a query message. In block 50 the query message is received and block 51 entered. Block 51 checks to see if the query is for sensor data. If so, branch 52 is taken to block 54, which reads the sensor associated with the local computer and formats and sends a response to the query. If the query is not for sensor data branch 53 is taken to block 55 which checks to see if the query is for the local action. If so, branch 56 is taken to block 58, which accesses the local action, if currently defined, and formats and sends a response to the query. If the query is not for the local action, branch 57 is taken to block 59, which performs any other query processing or determines that an erroneous query was received. After block 59 completes block 50 is entered to wait for the next query. It will be understood that each local node may have provisions for removing noise from the data received from the sensors, thus permitting the transmission of the data to other nodes with reduced bandwidth requirements.

FIG. 5 illustrates situation determination, given the local and remote sensor readings. In block 70 the remote sensor data is processed so as to derive statistical measures such as average, median and standard deviation. These measures, together with the local sensor reading are combined into a comparison vector in block 71. It should be appreciated that the processing in block 70 is illustrative only, and that other measures of the remote sensor data may also be appropriate in given situations. Block 72 initializes an index that is used in block 73 to retrieve a template. This template contains specific values or ranges corresponding to each entry in the comparison vector, and block 73 causes a template-matching algorithm to be applied to the comparison vector and to the template in order to determine whether there is a match. For example, the template-matching algorithm can require that the average remote sensor value match the local sensor value to within a tolerance, unless the standard deviation in remote sensor values is too large. This template would be appropriate to discover reliable agreement between local and remote sensor readings.

If block 73 determines that a match exists, branch 75 is taken to block 80, which returns the index i to the output of block 41 in FIG. 3. If no match exists then branch 74 is taken to block 76, where the index is incremented and compared to a limit, in block 76a. If that limit is exceeded then there are no more templates to be matched and branch 78 is taken to block 79, which returns its result to the output of block 41 in FIG. 3. If the limit is not exceeded then branch 77 is taken to block 73, which compares the comparison vector to the next template.

Figure 6:
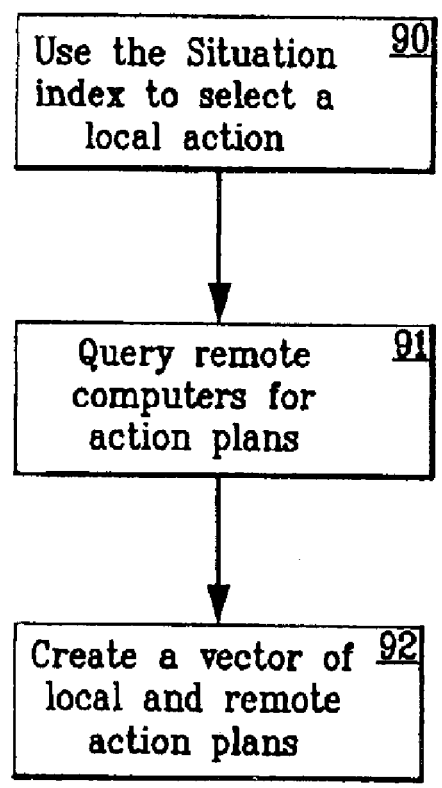
FIG. 6 is a flow diagram of the processing of a portion of FIG. 3.

FIG. 6 illustrates the processing in block 42 of FIG. 3 in greater detail. In block 90, the situation index as determined in block 80 of FIG. 5 is used as an index into a separate array of action plans. Preferably, each array entry is the name of an action plan. This permits the same action plan for multiple situations, if desired. Action plan names will be used in block 46 of FIG. 3 to find a procedure to be executed. Block 91 retrieves action plans from remote computers, preferably in terms of action plan names. Since the software in all computers is the same, all remote computers use the same names for an action plan as does the local computer. Finally in block 92 a vector of action plan names is created. This vector will be used in block 43 of FIG. 3 to determine whether the selected local action plan should be modified.

In addition to the examples mentioned above, the present invention may have application in, for example, monitoring the physiological response of a group of individuals to determine if a situation exists. A node may be defined as the individual carrying a processor, or a group of individuals, such as the occupants of an automobile or other vehicle, with a single processor for the vehicle. If the rate of heartbeat or breathing (or other bio-sensor data) of an individual or a number of individuals in the vehicle collectively, or in a group of vehicles, were to suddenly increase, this may indicate an impending or actual accident. Upon a recognition of this situation, local decisions may be made and local actions may be taken. In the case of an impending accident, monitoring devices, such as cameras mounted in the eyeglasses of passengers in nearby vehicles (even if these passengers are not aware of the impending accident), or on the vehicles or nearby vehicles, may be activated to record the event for use in later legal proceedings. After the accident occurs, emergency medical aid may be dispatched to the scene, even though no person involved in the accident is capable of calling for help, thus potentially saving lives.

In a similar fashion, in accordance with the invention, physiological monitoring of players during sports events may be implemented. Data can assist the producers of events in making decisions on how to cover plays, so as to not miss key portions of those plays. By agreement, the local decisions made by various producers may be shared with other producers, so that all networks covering the event have an opportunity to show the same important or key portions of play, or perhaps to show something different from all other networks.

It can be seen that the description given above provides a simple, but complete implementation of distributed decision-making based on aggregated sensory data. The implementation is efficient and software in all computers is identical, facilitating deployment of the solution. It will be appreciated that other situation-determination and action decision methods than those described may be appropriate to other applications. The invention does not depend on communication between computers being wireless; nor is there a limit on the number of computers that can spontaneously participate in distributed decisions. Further, although the invention has been described in terms of computer software and its various components, one skilled in the art will understand that many of the functions may be implemented using hardware components instead, especially in situations where very high speed is essential, and increased costs for such hardware is not an obstacle to deployment. Such hardware components and implementations may be equivalent to software, the software components and implementations of the invention described herein.

Thus, variations described for the present invention can be realized in any combination desirable for each particular application. Particular limitations, and/or embodiment enhancements described herein, which may have particular advantages to the particular application need not be used for all applications. Also, it should be realized that not all limitations need be implemented in methods, systems and/or apparatus including one or more concepts of the present invention.

The present invention can be realized in hardware, software, or a combination of hardware and software. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. The concepts of this invention may be used for many applications. Thus, although the description is made for particular arrangements and methods, the intent and concept of the invention is suitable and applicable to other arrangements and applications. It will be clear to those skilled in the art that other modifications to the disclosed embodiments ought to be effected without departing from the spirit and scope of the invention. The described embodiments ought to be construed to be merely illustrative of some of the more prominent features and applications of the invention, Other beneficial results can be realized by applying the disclosed invention in a different manner or modifying the invention in ways known to those familiar with the art. Thus, it should be understood that the embodiments has been provided as an example and not as a limitation. The scope of the invention is defined by the appended claims. Having thus described our invention,

What we claim as new and desire to secure by Letters Patent is as follows:

1. In a distributed computing system having a plurality of nodes, each node having a sensor for providing local data and a processor, said computing system having a data transfer facility for transferring data between nodes, a method for processing data comprising:
   acquiring local data, remote data and remote action decisions at a node;
   analyzing the local data, the remote data and the remote action decisions at said node to determine whether a situation requiring a decision for local action exists;
   making a local action decision for said node based on said local data, said remote data, and said remote action decisions; and
   if a situation requiring local action exists, selecting a local action based on said situation.

2. The method of claim 1, wherein said determining of whether a situation exists, comprises:
   extracting statistical measures from remote sensor data, said data being representative of respective environments in which said sensors are located;
   comparing said measures to a series of templates; and
   determining that a situation exists if said measures compare to one of said templates with a predetermined tolerance value.

3. The method of claim 2, wherein the comparing comprises:
   forming a comparison vector from said measures; and
   comparing said vector to said series of templates.

4. The method of claim 3, wherein said selecting an action and acquiring remote action plans based on said situation comprises:
   using a situation index to select a local action;
   querying remote nodes for action plans; and
   creating a vector of local and remote action plans.

5. The method of claim 1, further comprising:
   acquiring remote action plans based on said situation;
   modifying a local action based on said remote action plans; and
   initiating a modified local action.

6. The method of claim 1, further comprising communicating a local action decision to nodes in said system other than where the decision was made.

7. The method of claim 1, wherein each node queries each other node.

8. The method of claim 1, wherein a node queries each other node for data obtained from respective local sensors associated with each other node.

9. The method of claim 5, further comprising processing the data to remove noise.

10. The method of claim 9, wherein the data is processed to remove noise at the node from which the data is obtained.

11. The method of claim 1, wherein a node queries each other node to determine what course of action has been determined by said other nodes.

12. The method of claim 1, wherein in response to a query, a node determines whether the query is for sensor data, local action data, or both sensor data and local action data, and the node sends to an inquiring node at least one of local sensor data and local action data.

13. The method of claim 1, wherein said data transfer facility is a wireless data transfer facility.

14. The method of claim 1, wherein the sensors are bio-sensors, and the data produced by the sensors is bio-data.

15. The method of claim 1, wherein the sensors are traffic sensors, and the data produced by the sensors relates to traffic.

16. The method of claim 1, wherein the sensors are audio sensors, and the data produced by the sensors relates to events producing a significant audio component.

17. The method of claim 1, wherein the event producing a significant audio component is a gunshot.

18. A computing system comprising:
   a plurality of nodes, each node having a sensor for acquiring data, and a processor for processing data, said processor having computer program components;
   a data transfer facility for transferring data between the nodes;
   said program components being for acquiring local data from said sensor and remote data from said other nodes via said data transfer facility, said program components also analyzing said local data, data from other nodes and local decisions made at and received from other nodes, and said program components including a component for determining whether a situation requiring a decision for local action exists; and a program component for selecting a local action based on said situation, if a situation requiring local action exists.

19. The system of claim 18, wherein each of said nodes comprises:

a memory for storing data and programs, wherein said programs include an operating system, middleware and an application.

20. The system of claim 18, further comprising:

a component for extracting statistical measures from remote sensor data, said data being representative of respective environments in which said sensors are located;

a series of templates, each template corresponding to a situation;

a component for comparing said measures to said series of templates; and a component for determining that a situation exists if said measures compare to one of said templates within a predetermined tolerance value.

21. The system of claim 20, wherein the component for comparing comprises:

a component for forming a comparison vector from said measures; and a component for comparing said vector to said series of templates.

22. The system of claim 18, wherein said component for selecting a local action based on said situation comprises:

a situation index to select a local action;

a component for querying remote nodes for action plans; and a component for creating a vector of local and remote action plans.

23. The system of claim 18, further comprising:

a component for acquiring remote action plans based on said situation;

a component for modifying a local action based on said remote action plans; and a component for initiating a modified local action.

24. The system of claim 18, further comprising a component for communicating a local action decision to nodes in said system other than where the decision was made.

25. The system of claim 18, wherein each node comprises a component for querying each other node.

26. The system of claim 18, wherein each node has a component for querying each other node for data obtained from respective local sensors associated with each other node.

27. The system of claim 18, further comprising a component for processing data to remove noise.

28. The system of claim 18, wherein components for processing data to remove noise are located at the nodes from which the data is obtained.

29. The system of claim 18, comprising a component for causing a node to query each other node to determine what course of action has been determined by said other nodes.

30. The system of claim 18, comprising a component which, in response to a query, permits a node to determine whether the query is for sensor data, local action data, or both sensor data and local action data, and causes the node to send to an inquiring node at least one of local sensor data and local action data.

31. The system of claim 18, wherein said data transfer facility is a wireless data transfer facility.

32. An article of manufacture comprising a computer usable medium having computer readable program code means embodied therein for running on a processor associated with a node in a computer system having various nodes, the nodes having sensors which provide data, and the nodes being connected by a communications facility, said program code being for:

acquiring local data from said sensor and remote data from other nodes via said data transfer facility, processing data from a local sensor at said node and from remote sensors at other nodes;

analyzing said local data, data from other nodes and local decisions made at and received from other nodes to determine whether a situation requiring a decision for local action at said node exists; and if a situation requiring local action exists, selecting a local action based on said situation.

33. The article of manufacture as recited in claim 32, wherein said program code comprises:

a component for extracting statistical measures from remote sensor data, said data being representative of respective environments in which said sensors are located;

a series of templates, each template corresponding to a situation;

a component for comparing said measures to said series of templates; and a component for determining that a situation exists if said measures compare to one of said templates within a predetermined tolerance value.

34. The article of manufacture as recited in claim 33, wherein the component for comparing comprises:

a component for forming a comparison vector from said measures; and a component for comparing said vector to said series of templates.

35. The article of manufacture as recited in claim 32, wherein said computer code comprises a component for selecting an action based on said situation, and said component comprises:

a situation index to select a local action;

a component for querying remote nodes for action plans; and a component for creating a vector of local and remote action plans.

36. The article of manufacture as recited in claim 32, wherein the computer code comprises:

a component for acquiring remote action plans based on said situation;

a component for modifying a local action based on said remote action plans; and a component for initiating a modified local action.

37. The article of manufacture as recited in claim 32, comprising a computer code component for communicating a local action decision to nodes in said system other than where the decision was made.

38. The article of manufacture as recited in claim 32, wherein the computer code comprises a component for querying each other node.

39. The article of manufacture as recited in claim 32, wherein the computer code has a component for querying each other node for data obtained from respective local sensors associated with each other node.

40. The article of manufacture as recited in claim 32, comprising a computer code component for processing data to remove noise.

41. The article of manufacture as recited in claim 32, comprising a computer code component for causing the node to query each other node to determine what course of action has been determined by said other nodes.

42. The article of manufacture as recited in claim 32, comprising
   a computer code component which, in response to a query, permits the node to determine whether the query is for sensor data, local action data, or both sensor data and local action data, and
   a computer code component for causing the node to send to an inquiring node at least one of local sensor data and local action data.

43. The article of manufacture as recited in claim 32, in combination with a program storage device for communicating with a computer, the program storage device communicating to the computer the program code.

44. The method of claim 1, further comprising making a group consensus decision based on an aggregation of said local data, said remote data, and said remote action decisions.

45. The system of claim 18, further comprising a program component for making a group consensus decision based on an aggregation of said local data, said remote data, and said remote action decisions.

46. The article of manufacture as recited in claim 32, comprising computer code for making a group consensus decision based on an aggregation of said local data, said remote data, and said remote action decisions.

47. The method of claim 1, wherein said local data, said remote data, and said remote action decisions, are based on conditions existing in a local environment associated with a node.

48. The system of claim 18, wherein said local data, said remote data, and said remote action decisions, are based on conditions existing in a local environment associated with a node.

49. The article of manufacture as recited in claim 32, comprising computer code for processing said local data, said remote data, and said remote action decisions, wherein said local data, said remote data, and said remote action decisions are based on conditions existing in a local environment associated with a node.

* * * * *